United States Patent
Moussaoui et al.

(10) Patent No.: US 10,164,441 B2
(45) Date of Patent: Dec. 25, 2018

(54) SYSTEM AND METHOD FOR CELL BALANCING AND CHARGING USING A SERIALLY COUPLED INDUCTOR AND CAPACITOR

(71) Applicant: Intersil Americas LLC, Milpitas, CA (US)

(72) Inventors: Zaki Moussaoui, San Carlos, CA (US); Tony Allen, Los Gatos, CA (US)

(73) Assignee: INTERSIL AMERICAS LLC, Milpitas, CA (US)

(*) Notice: Subject to any disclaimer, the term of this patent is extended or adjusted under 35 U.S.C. 154(b) by 1 day.

(21) Appl. No.: 14/750,847

(22) Filed: Jun. 25, 2015

(65) Prior Publication Data

US 2015/0295429 A1    Oct. 15, 2015

Related U.S. Application Data

(63) Continuation of application No. 12/650,775, filed on Dec. 31, 2009, now Pat. No. 9,397,508.

(Continued)

(51) Int. Cl.
*H02J 7/00*    (2006.01)

(52) U.S. Cl.
CPC .......... *H02J 7/0019* (2013.01); *H02J 7/0014* (2013.01); *H02J 7/0016* (2013.01); *H02J 7/0018* (2013.01); *H02J 7/0052* (2013.01); *H02J 7/0081* (2013.01)

(58) Field of Classification Search
CPC ...... H02J 7/0016; H02J 7/0019; H02J 7/0014; H02J 7/0081; H02J 7/0018; H02J 7/0052

(Continued)

(56) References Cited

U.S. PATENT DOCUMENTS

| | | | |
|---|---|---|---|
| 4,200,830 A * | 4/1980 | Oughton | H02J 7/022 320/140 |
| 5,132,889 A | 7/1992 | Hitchcock et al. | |

(Continued)

FOREIGN PATENT DOCUMENTS

| | | |
|---|---|---|
| CN | 101924382 | 12/2010 |
| CN | 104917247 | 9/2015 |

(Continued)

OTHER PUBLICATIONS

European Patent Office, "Office Action from EP Application No. 10163571.2 dated Apr. 4, 2016", "from Foreign Counterpart of U.S. Appl. No. 12/650,775", Apr. 4, 2016, pp. 1-5, Published in: EP.

(Continued)

*Primary Examiner* — Richard Isla
*Assistant Examiner* — Manuel Hernandez
(74) *Attorney, Agent, or Firm* — Foley & Lardner LLP

(57) ABSTRACT

An apparatus for charging a plurality of series connected battery cells, includes a first and second input terminals for providing a charging voltage to the plurality of series connected battery cell. A transformer includes a primary side associated with the charging voltage and a secondary side includes a plurality of portions. Each of the plurality of portions is connected across at least one of the plurality of series connected battery cell. A switch in series between each of the plurality of portions of the secondary side and the at least one of the plurality of series connected battery cells increases an impedance between the portion of the secondary side and the associated one of the plurality of series connected battery cells in a first state and decreases the impedance between the portion of the secondary side and the associated one of the plurality of series connected battery cells in a second state.

27 Claims, 11 Drawing Sheets

Related U.S. Application Data

(60) Provisional application No. 61/180,618, filed on May 22, 2009, provisional application No. 61/244,643, filed on Sep. 22, 2009.

(58) Field of Classification Search
USPC .......................................................... 320/116
See application file for complete search history.

(56) References Cited

U.S. PATENT DOCUMENTS

| | | | |
|---|---|---|---|
| 5,568,036 | A | 10/1996 | Hulsey et al. |
| 5,956,241 | A | 9/1999 | LoCascio |
| 5,982,143 | A | 11/1999 | Stuart |
| 6,140,800 | A | 10/2000 | Peterson |
| 6,356,055 | B1 | 3/2002 | Lin et al. |
| 6,670,789 | B2 | 12/2003 | Anzawa et al. |
| 6,801,014 | B1 | 10/2004 | Chitsazan et al. |
| 6,841,971 | B1 | 1/2005 | Spee et al. |
| 7,400,114 | B2 | 7/2008 | Anzawa et al. |
| 7,804,276 | B2 | 9/2010 | Roessler |
| 8,541,980 | B2 | 9/2013 | Moussaoui et al. |
| 8,779,722 | B2 | 7/2014 | Lee et al. |
| 2002/0109482 | A1 | 8/2002 | Anzawa et al. |
| 2003/0038612 | A1 | 2/2003 | Kutkut |
| 2003/0214821 | A1* | 11/2003 | Giannopoulos ......... H02J 7/025 363/21.02 |
| 2004/0212352 | A1* | 10/2004 | Anzawa .................. H02M 1/08 320/166 |
| 2004/0217735 | A1* | 11/2004 | Chitsazan ............. H02J 7/0018 320/116 |
| 2005/0140336 | A1 | 6/2005 | Anzawa et al. |
| 2008/0272735 | A1 | 11/2008 | Roessler |
| 2009/0140694 | A1 | 6/2009 | Zeng |
| 2009/0278489 | A1 | 11/2009 | St-Jacques |
| 2010/0208499 | A1 | 8/2010 | Halberstadt |
| 2010/0295509 | A1 | 11/2010 | Moussaoui et al. |
| 2013/0249476 | A1* | 9/2013 | Touzani .............. H01M 10/441 320/107 |
| 2014/0340022 | A1* | 11/2014 | Kang .................... H02J 7/0014 320/103 |
| 2015/0295428 | A1 | 10/2015 | Moussaoui et al. |

FOREIGN PATENT DOCUMENTS

| | | |
|---|---|---|
| EP | 1737097 | 12/2006 |
| EP | 2276140 | 1/2011 |
| JP | 2004088878 | 3/2004 |
| JP | 2004129455 | 4/2004 |
| JP | 2004328868 | 11/2004 |
| JP | 2010288447 | 12/2010 |
| TW | M289925 | 4/2006 |
| TW | 201108544 | 3/2011 |
| WO | 2009131336 | 10/2009 |

OTHER PUBLICATIONS

European Search Report, "Extended European Search Report from EP Application No. 15202503.7 dated Apr. 8, 2016", "from Foreign Counterpart of U.S. Appl. No. 12/650,775", Apr. 8, 2016, pp. 1-6, Published in: EP.

European Patent Office, "Extended European Search Report from EP Application No. 15202520.1 dated Apr. 7, 2016", "from Foreign Counterpart of U.S. Appl. No. 12/650,775", Apr. 7, 2016, pp. 1-7, Published in: EP.

Korean Intellectual Property Office, "Office Action from KR Application No. 10-2010-0048306 dated Mar. 21, 2016", "from foreign counterpart of U.S. Appl. No. 12/650,775", Mar. 21, 2016, pp. 1-9, Published in: KR.

Korean Intellectual Property Office, "Office Action from KR Application No. 10-2015-0092263 dated Mar. 21, 2016", "from Foreign Counterpart of U.S. Appl. No. 12/779,433", Mar. 21, 2016, pp. 1-22, Published in: KR.

U.S. Patent and Trademark Office, "Notice of Allowance", "from U.S. Appl. No. 12/650,775", dated Mar. 17, 2016, pp. 1-13, Published in: US.

European Search Report for European application No. EP10163571; dated Oct. 23, 2013, Munich, Germany, 2 pages.

Taiwanese Office Action issued for Taiwan Patent Application No. 099116271; titled: "System and Method for Cell Balancing and Charging", Applicant: Intersil Americas Inc.; issued at Taiwan International Patent Office dated Sep. 14, 2013, Taiwan, 15 pages.

Milan M. Jovanovic, "Merits and Limitations of Resonant and Soft-Switched Converters", 14th International Telecommunications Energy Conference, Oct. 1992; Washington, DC; Intelec '92., DOI: 10.1109/INTLEC.1992.268463 Publication Year: 1992 , pp. 51-58.

O.D. Patterson, and D.M. Divan, "Pseudo-Resonant Full Bridge DC/DC Converter", IEEE Power Electronics Specialists Conf. Rec., Jun. 1987, Blacksburg, VA; pp. 424-430.

John G. Kassakian, Martin F. Schlecht, and George C. Verghese: "Principles of Power Electronics", Jul. 1991 by Addison-Wesley Publishing Compan Inc.; 5 pages.

A. Rajapandian, V. Ramanarayanan, and R. Ramkumar: "A 250 kHz/560 W phase modulated converter", Power Electronics, Drives and Energy Systems for Industrial Growth, 1996., Proceedings of the Jan. 1996 International Conference in New Delhi, India; vol. 1; DOI: 10.1109/PEDES.1996.537276 Publication Year: 1996, pp. 20-26.

Robert W. Erickson, and Dragan Maksimovic: "Fundamentals of Power Electronics", second edition; published by Springer Science-Business Media, LLC; New York, NY, 2001; 7 pages.

\* cited by examiner

SYSTEM AND METHOD FOR CELL BALANCING AND CHARGING USING A SERIALLY COUPLED INDUCTOR AND CAPACITOR

PRIORITY CLAIM

The present application is a Continuation of copending U.S. patent application Ser. No. 12/650,775, filed Dec. 31, 2009, now U.S. Pat. No. 9,397,508; which application claims priority to U.S. Provisional Patent Application Ser. No. 61/180,618, filed May 22, 2009, and U.S. Provisional Patent Application Ser. No. 61/244,643, filed Sep. 22, 2009; all of the foregoing applications are incorporated herein by reference in their entireties.

RELATED APPLICATION DATA

This application is related to U.S. patent application Ser. No. 14/750,702 entitled SYSTEM AND METHOD FOR CELL BALANCING AND CHARGING USING A SERIALLY COUPLED INDUCTOR AND CAPACITOR filed on Jun. 25, 2015, and which is incorporated herein by reference in its entirety.

BRIEF DESCRIPTION OF THE DRAWINGS

For a more complete understanding, reference is now made to the following description taken in conjunction with the accompanying Drawings in which.

DETAILED DESCRIPTION

Figure 1:
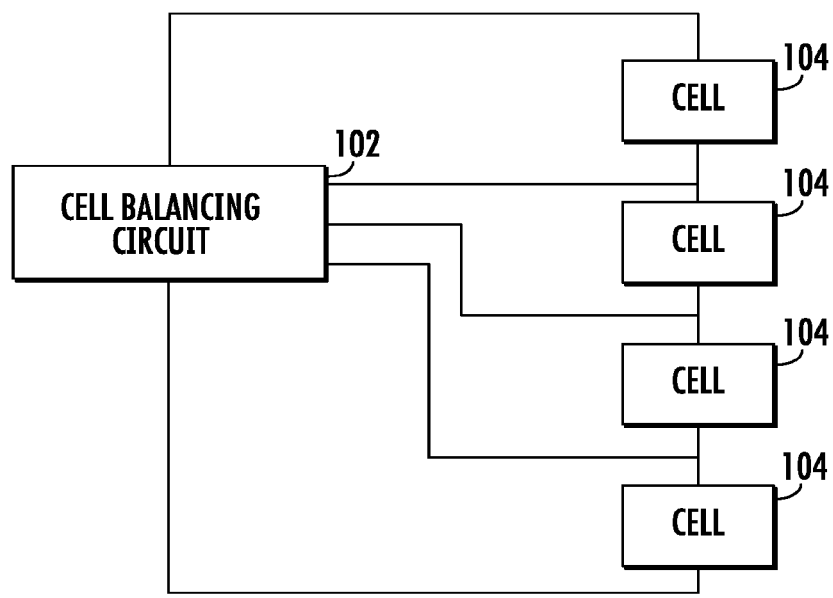
FIG. 1 is a block diagram illustrating the connection of a cell balancing circuit with a series connection of battery cells.

Referring now to the drawings, wherein like reference numbers are used herein to designate like elements throughout, the various views and embodiments of a system and method for cell balancing and charging are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

Cell balancing and charging systems provide the ability to charge a series connection of battery cells using a single source. Systems using multiple lithium ion or super capacitor cells require balancing of the individual cells in order to maximize the energy available from the batteries and to prolong the life of the system. Resistive balancing systems for charging cells dissipate excess charge as heat are one common solution but these types of systems waste energy. Energy transfer systems which are based on a "nearest neighbor" inductive or capacitive energy transfer reduce the amount of wasted energy but are complex and generally provide less than satisfactory results when transferring charge over a distance of several cells. Thus, there is a need for a cell balancing and charging system that solves the dual problems of balancing the state of charge of cells within a stack of battery cells without dissipating the energy in an associated resistor and further providing efficient transfer of charge to any cell in the stack without a distance penalty. The common way of balancing cells within a multi cell battery is by discharging the highest cell through a pass element or alternatively by passing the charge from a pass element to an adjacent cell.

Referring now to the drawings, and more particularly to FIG. 1, there is illustrated a configuration of a cell balancing circuit 102 which is connected with a series connection of battery cells 104. The charge level on a particular battery cell 104 may be moved from one cell to another in order to balance the charge load across each of the cells 104. The cell balancing circuit 102 is responsible for carrying out this cell balancing/charging functionality. Various types of systems, as discussed herein above, exist for transferring the charge from one cell within a cell stack to an adjacent cell. However, these systems are overly complex and expensive and suffer from poor efficiency when transferring charge over several cells such as from one end of the cell stack to the other.

Figure 2:
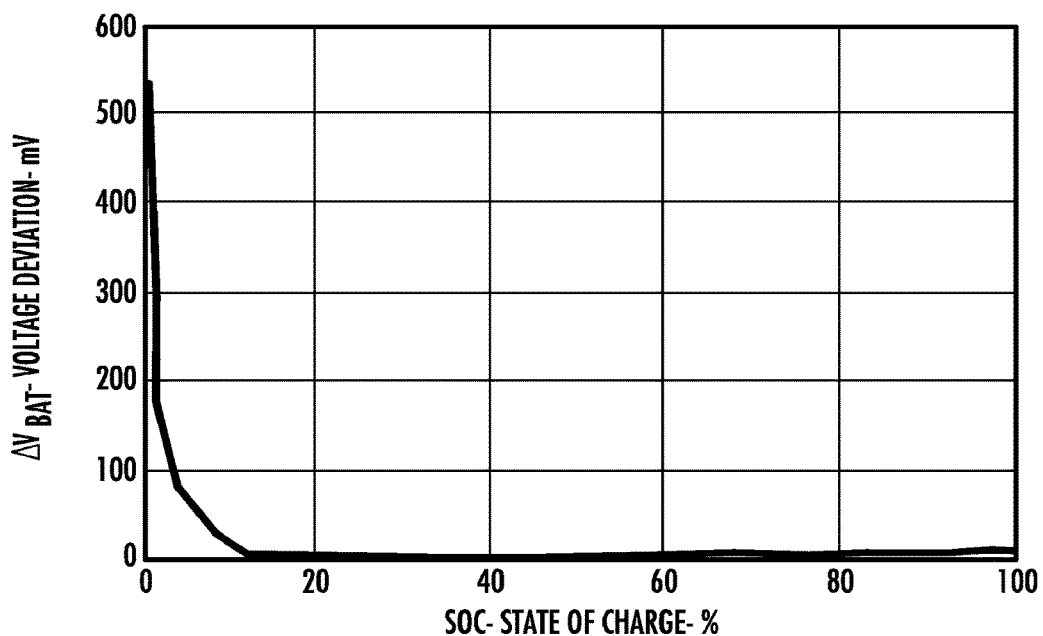
FIG. 2 illustrates voltage differences between two cells as a function of the percent of state of charge of the cells.

Referring now to FIG. 2, there is illustrated the voltage differences between two cells as a function of the percent state of charge. When batteries of different impedances or voltages are connected in series, the state of charge of the entire pack is limited. At a low state of charge percentage the voltage deviation is very high and can approach 500 millivolts deviation. The voltage deviation significantly decreases and approaches zero as the state of charge approaches 20%. Thus, during the charging cycle, the battery including a higher charge voltage may end up overcharged and damaged, or alternatively, a battery including a lower charge level may end up undercharged in order to protect the higher charge battery. In either case, the battery's cells will not reach their maximum charge voltage. During discharge, the lower charge battery may pull the total capacity of the series connection to a low level and prevent the taking of maximum charge from the system.

Figure 3:
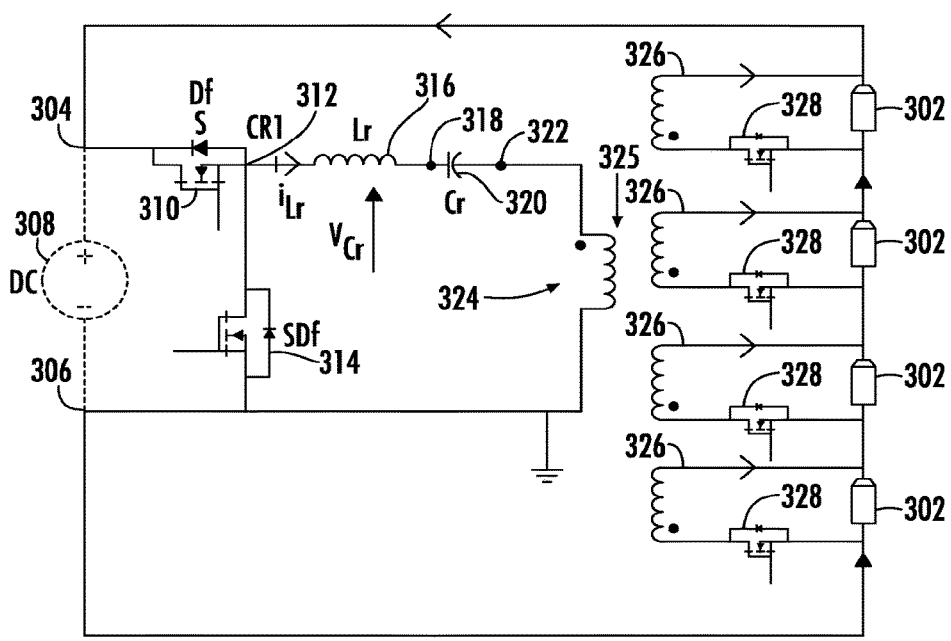
FIG. 3 illustrates a schematic diagram of a circuit for charging and balancing of cells.

Referring now to FIG. 3, there is illustrated a first embodiment of a circuit for providing charging and load balancing of a series connection of battery cells 302. The series connection of battery cells 302 are connected between node 304 and node 306. A charging voltage is supplied to the battery cells 302 via a voltage source 308 provided between nodes 304 and 306. Node 306 comprises the ground node while node 304 comprises the input voltage node. A high-side switching transistor 310 MOSFET has its source/drain path connected between node 304 and node 312. A low-side switching transistor 314 MOSFET has its drain/source path connected between node 312 and the ground node 306.

A resonant tank circuit consisting of inductor 316 and capacitor 320 is connected between node 312 and node 322. The inductor 316 is connected between node 312 and node 318. The capacitor 320 is connected in series with the inductor 316 between node 318 and node 322. A primary side 324 of a transformer 325 is connected to node 322 and to the ground node 306. The secondary side of the transformer 325 includes a number of secondary portions 326, each of which are connected across the terminals of an associated battery cell 302. The polarity of adjacent secondary side portions 326 of the transformer are reversed from each other. A switching MOSFET 328 has its drain/source path connected between the secondary portion 326 of the transformer 325 and the negative terminal of the associated battery cell 302. The switch 328 would receive control signals from a control circuit (not shown) which also controls switching transistors 310 and 314.

During the charging cycle, the system of FIG. 3 is based upon a resonant converter for every switching cycle, and the amount of energy that is put into the resonant tank by the voltage source 308 is then transferred to the secondary side portions 326. The lowest charged voltage cells will then take most of the energy transmitted to the secondary side 326 from the resonant tank and the highest charged voltage cells the least. Thus, the charge is transferred to the second portion 326 in proportion to the charge on the associated battery cells. In order to add more protection and control, the switch 328 is added in series with each secondary portion 326 to increase or decrease the overall impedance of the battery cell 302. This allows selective charging of the battery cells such as might be required when a cell is to be charged to a higher voltage than other cells. Thus, the cells are balanced during charging.

Figure 4:
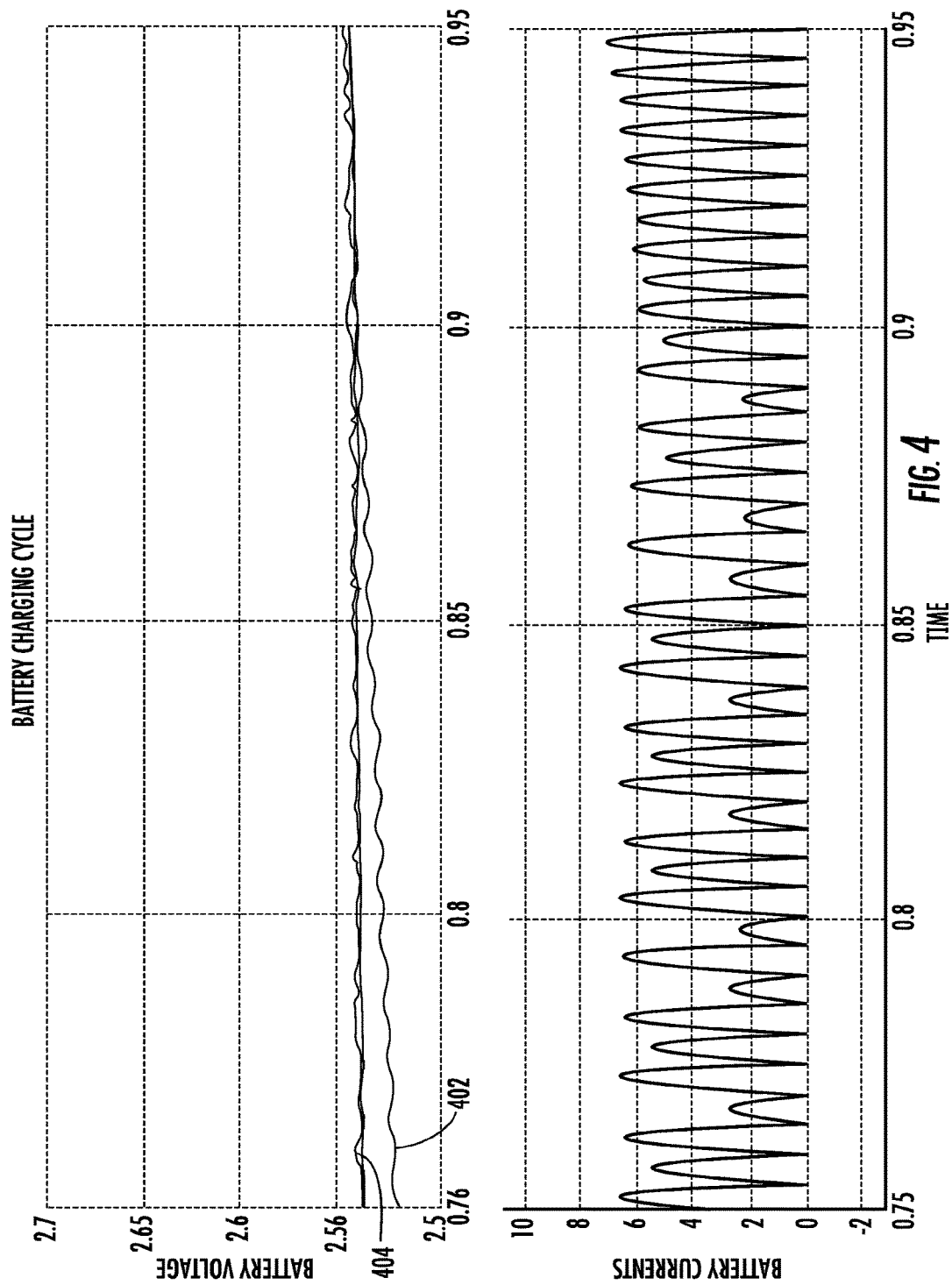
FIG. 4 illustrates the battery charging cycle during transition.

As can be seen in FIG. 4, the lowest voltage cells are taking all of the energy provided by the resonant tank while the higher voltage battery cells are sitting idle until the lower battery cells catch up in charge value with the higher value tanks. Thus, waveform 402 represents the charging battery voltage of the lower charge battery cell while waveform 404 represents the higher voltage battery.

Figure 5:
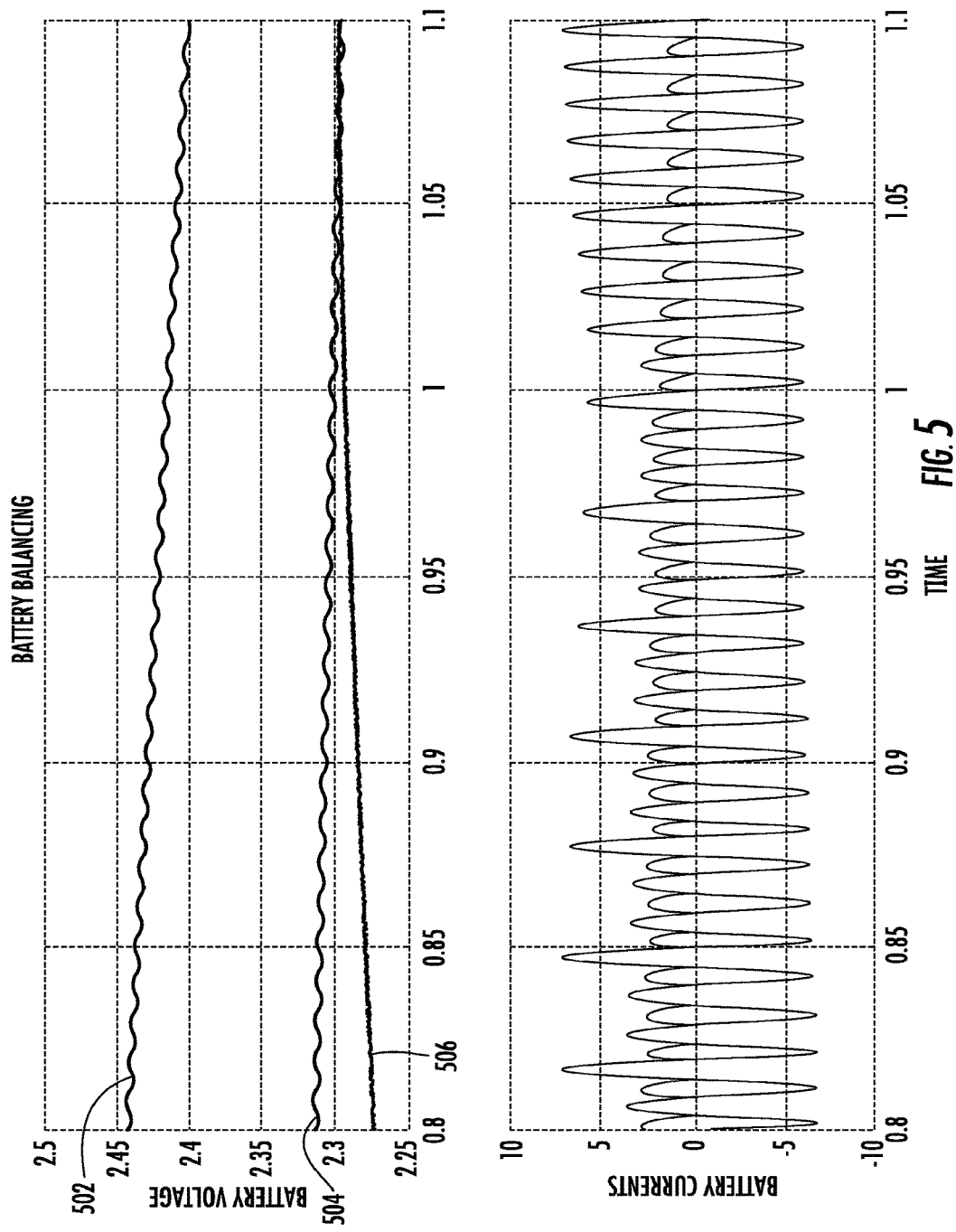
FIG. 5 illustrates the battery discharging cycle during transition.

During the discharge cycle, the input to the primary side 324 of the transformer 325 will comprise the total series voltages of all of the battery cells 302. The energy is circulating from all of the battery cells 302 back to the lowest charged cells. FIG. 5 illustrates the ampere hour taking every cycle from every cell is the same while the energy put back into the system is higher for the lower voltage batteries. Thus, waveform 502 represents the highest voltage battery cell, waveform 504 represents the next highest voltage battery cell while waveform 506 represents the lowest voltage battery cell.

The main difference between previous solutions and the implementation described herein above with respect to FIG. 3, is that the energy is taken from the entire stack of battery cells 302 and then redistributed back based on the battery cell that needs more energy than the other battery cells. This scheme permits very simple systems which automatically distribute charge without the need for a sophisticated control mechanism. A more sophisticated implementation is possible in which balancing may be performed using complex algorithms in a manner that maintains optimal performance with a variety of systems over the entire system life. The system may be equally implemented as a charger, balancer or both.

Figure 6:
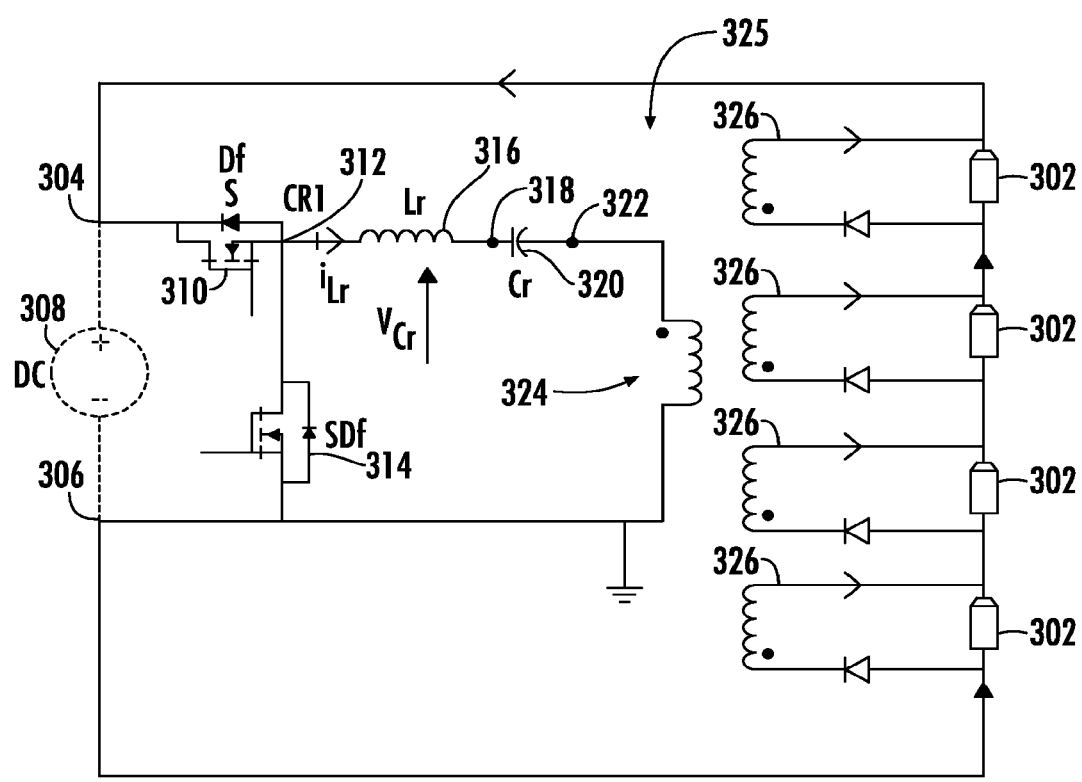
FIG. 6 illustrates an alternative embodiment of FIG. 3.
Figure 7:
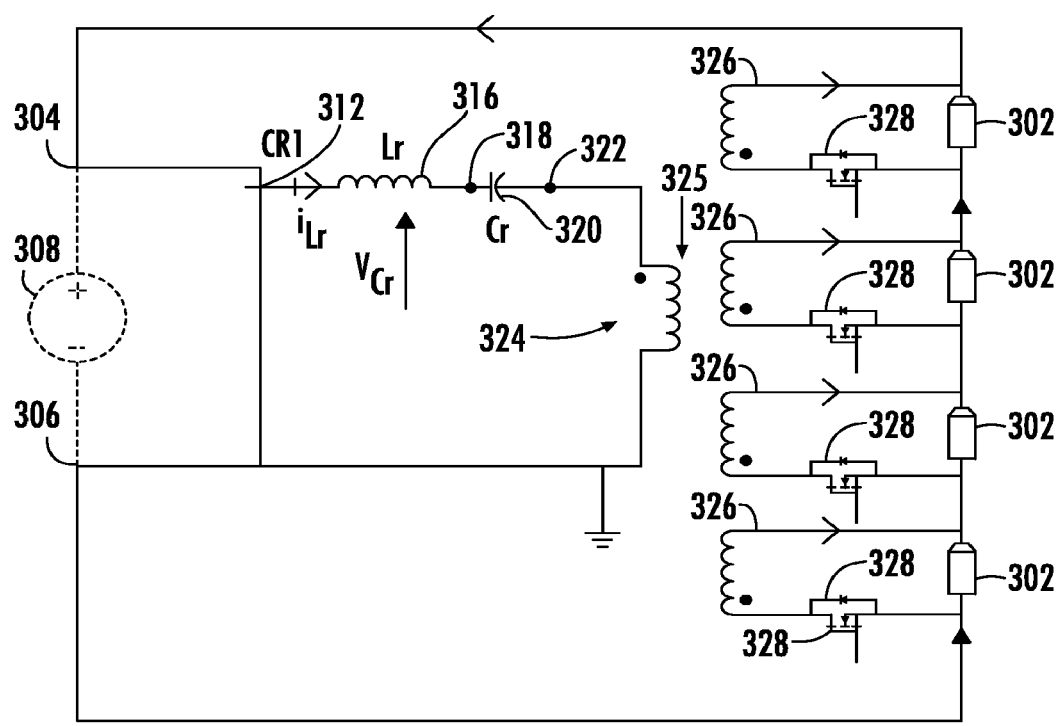
FIG. 7 illustrates yet another embodiment of the circuit of FIG. 3.
Figure 8:
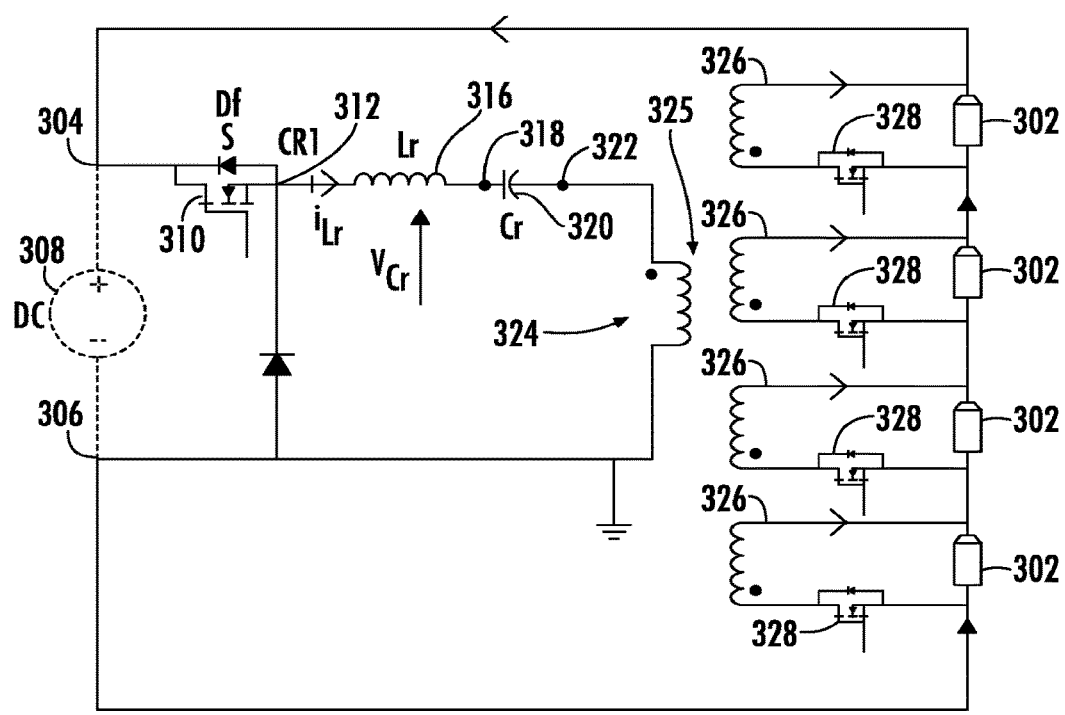
FIG. 8 illustrates yet a further alternative embodiment of the circuit of FIG. 3.

Referring now to FIG. 6, there is illustrated an alternative implementation of the circuit of FIG. 3 wherein the MOSFET switches 328 between the transformer secondaries 326 and the battery cells 302 are replaced by diodes 602. In another implementation illustrated in FIG. 7, the switches feeding the tank may be removed and the tank input grounded. In this system the switches between the transformer secondaries and the cells are replaced by a suitable arrangement of switches and conducting elements. Energy is passed to and from the tank circuit by selective use of the secondary side switches. E.g. the secondary side in FIG. 2 becomes both primary and secondary depending on the configuration of the switch elements. Alternatively, as illustrated in FIG. 8, the lower drive MOSFET 314 may be replaced by a diode 802. In an alternative control scheme, the currents through the transformer primary 324 may be sensed to determine a current limit providing an on time termination point for the circuit and a switch termination timing to determine when to turn off the switching transistors 310 and 314.

Figure 9:
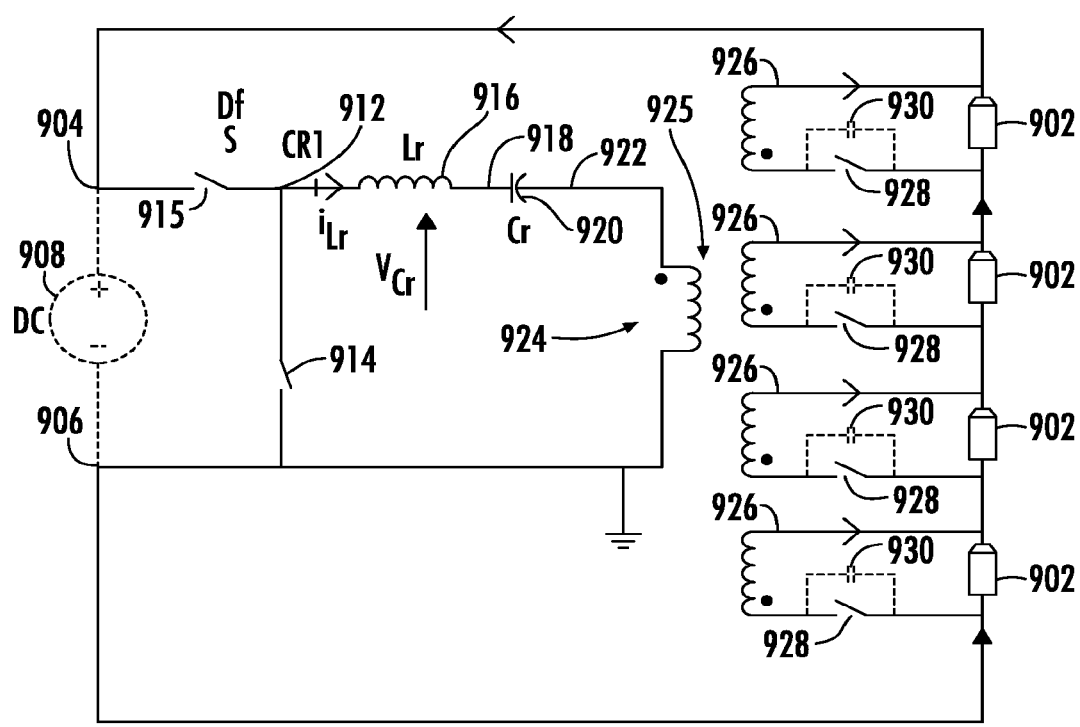
FIG. 9 illustrates a further embodiment of the battery charging and balancing circuit.

Referring now to FIG. 9, there is illustrated a further embodiment of the charging/balancing circuit of FIG. 3. The series connection of battery cells 902 are connected between node 904 and node 906. A charging voltage is supplied to the battery cells 902 via a voltage source 908 provided between nodes 904 and 906. Node 906 comprises the ground node while node 904 comprises the input voltage node. A high-side switch 910 is connected between node 904 and node 912. A low-side switch 914 is connected between node 912 and the ground node 906. A resonant tank circuit consisting of inductor 916 and capacitor 920 is connected between node 912 and node 922. The inductor 916 is connected between node 912 and node 918. The capacitor 920 is connected in series with the inductor 916 between node 918 and node 922.

A primary side 924 of a transformer 925 is connected to node 922 and to the ground node 906. The secondary side of the transformer 925 includes a number of secondary portions 926, each of which are connected across the terminals of the associated battery cell 902. A switch 928 is connected between the secondary portion 926 of the secondary side 926 of the transformer 925 and the negative terminal of the associated battery cell 902. The switch 928 would receive control signals from a control circuit (not shown) which also controls switches 915 and 914. In addition to the switch 928 connected between the transformer secondary portion 926 and the battery cell 902, a capacitor 930 is connected in parallel with the switch 928. In this scheme, current may be directed to individual cells 902 through the selective use of the secondary side switches 928 allowing programmable charge balancing or charge redirection to deliberately produce an unbalanced condition.

Figure 10:
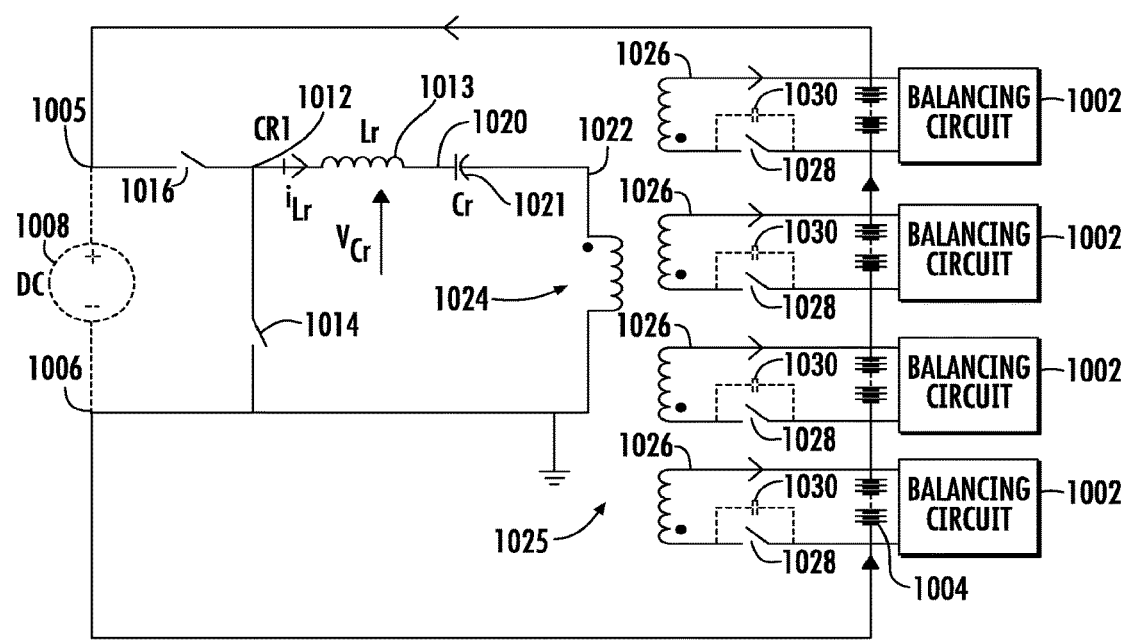
FIG. 10 illustrates a nested configuration of the charging and balancing circuit.

Referring now also to FIG. 10, there is illustrated a nested balancing system. Nested arrangements are possible in which each of the battery cells are replaced by the balancing circuit 1002 as described previously with respect to FIG. 3 and a series of battery cells 1004. The circuit of FIG. 10 comprises a series connection of battery cells 1004 are connected between node 1005 and node 1006. A charging voltage is supplied to the battery cells 1004 via a voltage source 1008 provided between nodes 1005 and 1006. Node 1006 comprises the ground node while node 1005 comprises the input voltage node. A high-side switch 1016 is connected between node 1005 and node 1012. A low-side switch 1014 is connected between node 1012 and the ground node 1006.

A resonant tank circuit consisting of inductor 1013 and capacitor 1021 is connected between node 1012 and node 1022. The inductor 1013 is connected between node 1012 and node 1018. The capacitor 1021 is connected in series with the inductor 1013 between node 1020 and node 1022. A primary side 1024 of a transformer 1025 is connected to node 1022 and to the ground node 1006. The secondary side of the transformer 1025 includes a number of secondary portions 1026, each of which are connected across the terminals of the associated battery cell stack 1004. A switch 1028 is connected between the secondary portion 1026 of the secondary side 1026 of the transformer 1025 and the negative terminal of the associated battery cell stack 1004. The switch 1028 would receive control signals from a circuit which also controls switches 1016 and 1014.

As mentioned previously, rather than a single cell, a series of cells 1004 are connected across each of the secondary portions 1026 of the secondary side of the transformer. Connected across these cells 1004 is the balancing circuit described previously with respect to FIG. 3. Thus, the battery cells 1004 would comprise the source 308 and the balancing circuit 1002 would connect with the source at nodes 304 and 306. Thus, each stack of cells 1004 includes its own balancing system 1002 such that nested balancing systems may be produced which optimizes the complexity/performance trade off.

In an alternative embodiment of the circuit of FIG. 10, the switches 1016 and 1014 feeding the resonant tank may be removed and the tank input grounded. In this implementation, the switches 1028 between the transformer secondaries 1026 and the cell stacks 1004 are replaced by a suitable arrangement of switches and conducting elements. Energy is passed to and from the resonant tank circuit by the selective use of the secondary side switches 1028. Thus, the secondary side becomes both the primary and secondary depending on the configuration of the switching elements.

Figure 11:
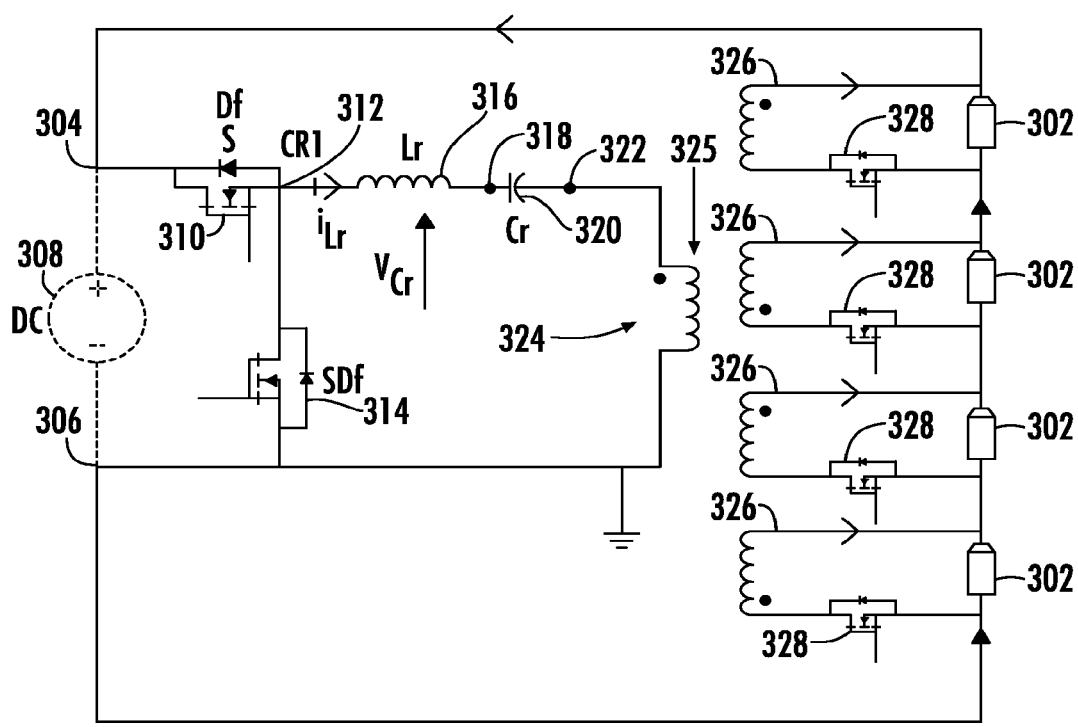
FIG. 11 is a block diagram of an alternative embodiment of the circuit of FIG. 3 wherein the polarities are reversed on some of the secondary winding portions.

In yet a further embodiment illustrated in FIG. 11, the circuitry is configured in substantially the same manner as that described with respect to FIG. 3. However, the polarities on the secondary side portions 326 are altered such that some (ideally half) of the secondary windings have one polarity and the remainder of the secondary windings have the opposite polarity. The actual sequence between the reversed polarities within the secondary windings is not important. The benefit that this configuration provides is that charge may be transferred on both half cycles of the transformer. The first half cycle feeds the secondaries with one polarity and the second half cycle feeds those with the opposite polarity.

Figure 12:
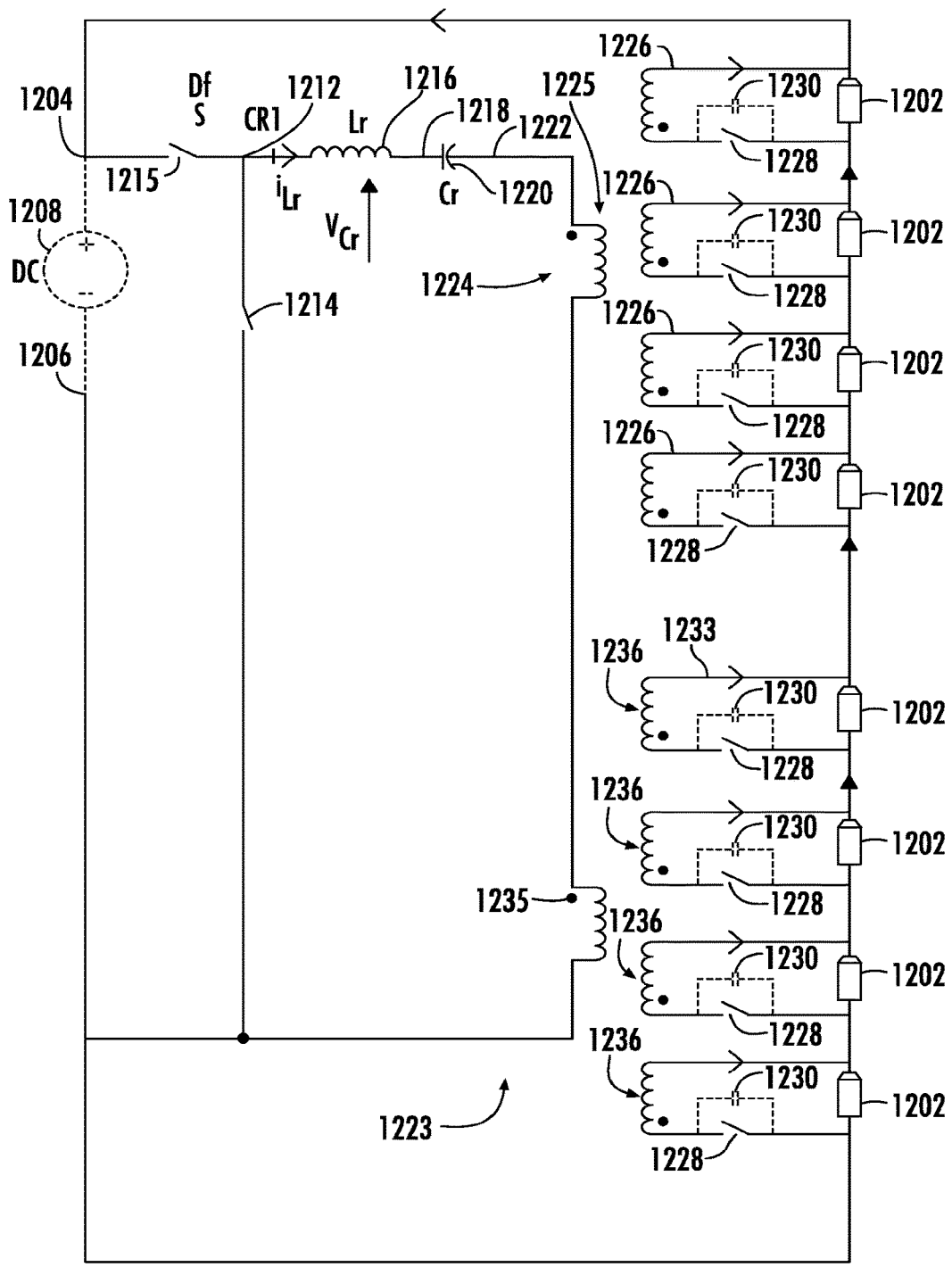
FIG. 12 illustrates an alternative embodiment including the plurality of series connected transformer portions enabling a stacked configuration that is scalable.

Referring now to FIG. 12, there is illustrated a further embodiment that comprises a stacked configuration including additional transformer 1233 placed in series with the first transformer 1225. The series connection of battery cells 1202 are connected between node 1204 and node 1206. A charging voltage is supplied to the battery cells 1202 via a voltage source 1208 provided between nodes 1204 and 1206. Node 1206 comprises the ground node while node 1204 comprises the input voltage node. A high-side switch 1210 is connected between node 1204 and node 1212. A low-side switch 1214 is connected between node 1212 and the ground node 1206. A resonant tank circuit consisting of inductor 1216 and capacitor 1220 is connected between node 1212 and node 1222. The inductor 1216 is connected between node 1212 and node 1218. The capacitor 1220 is connected in series with the inductor 1216 between node 1218 and node 1222.

A primary side 1224 of a first transformer 1225 is connected to node 1222 and to the ground node 1206. The secondary side of the transformer 1225 includes a number of secondary portions 1226, each of which are connected across the terminals of the associated battery cell 1202. A switch 1228 is connected between the secondary portion of the secondary side 1226 of the transformer 1225 and the negative terminal of the associated battery cell 1202. The switch 1228 would receive control signals from a control circuit (not shown) which also controls switches 1215 and 1214. In addition to the switch 1228 connected between the transformer secondary portion 1226 and the battery cell 1202, a capacitor 1230 is connected in parallel with the switch 1228. In this scheme, current may be directed to individual cells 1202 through the selective use of the secondary side switches 1228 allowing programmable charge balancing or charge redirection to deliberately produce an unbalanced condition.

In the second transformer 1223 of the stacked configuration, a primary side 1235 of the transformer 1223 is connected in series with the primary side 1224 of the first transformer 1225. Additionally, a further series of transformer secondaries 1236 are connected across additional battery cells 1202 in series with the transformer secondary portion 1226 of transformer 1225. As in the first portion of the circuit, a switch 1228 would receive control signals from a control circuit (not shown). In addition to the switch 1228 connected between the transformer secondary portion 1236 and the battery cell 1232, a capacitor 1230 is connected in parallel with the switch 1228. The stacked configuration is completely scalable. As many sections as needed may be added in series. Thus, rather than the two illustrated in FIG. 12, any number may be further added. A single pair of switches 1215 and 1214 and a single tank circuit consisting of inductor 1216 and capacitor 1220 then feed the series connected transformer windings.

Thus, the main difference between previous solutions and the present disclosure is that the energy is taken from the entire cell stack and redistributed based upon the cells that need more energy than the other. The scheme permits very simple systems which automatically charge without the need of a sophisticated control mechanism. More sophisticated implementations are possible in which the balancing may be performed using complex algorithms in a manner that maintains the optimal performance with a variety of systems and over the entire system life.

It will be appreciated by those skilled in the art having the benefit of this disclosure that this system and method for cell balancing and charging provides an improved manner of charging/balancing a stack of battery cells. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A method, comprising:
    generating an input current through serially coupled primary windings of multiple transformers, wherein generating the input current includes generating the input current in response to a resonating of an inductor and a capacitor coupled in series with the primary windings; and generating, in response to the input current, charge-balancing currents each flowing through a respective secondary winding of each of the transformers and a respective one of a set of serially connected battery cells such that each charge-balancing current has a magnitude that is related to a voltage on the respective at least one of the set of battery cells.

2. The method of claim 1 wherein generating the input current includes generating the input current in response to a voltage across at least one of the battery cells.

3. The method of claim 1 wherein generating the input current includes generating the input current in response to a current generated by at least one of the battery cells.

4. The method of claim 1 wherein generating the input current includes generating the input current in response to a current generated by a power supply.

5. The method of claim 1 wherein generating the charge-balancing currents includes generating at least one of the charge-balancing currents flowing in only one direction.

6. The method of claim 1 wherein generating the charge-balancing currents includes generating at least one of the charge-balancing currents only while the input current is flowing in a direction.

7. An apparatus, comprising:
an input circuit configured to generate an input current, wherein the input circuit includes an inductor and a capacitor in series with a first primary winding and is configured to generate the input current by causing the inductor and capacitor to resonate; and
transformers including
primary windings including the first primary winding coupled together in series and configured to receive the input current, wherein each of the transformers includes a respective one of the primary windings, and
secondary windings each configured to generate, in response to the input current, a respective charge-balancing current flowing through a respective at least one of battery cells that are coupled together in series such that the respective charge-balancing current has a magnitude that is related to a voltage across the respective at least one of the battery cells, wherein the each transformer further includes one or more of the secondary windings.

8. The apparatus of claim 7 wherein the input circuit is configured to generate the input current in response to a voltage across at least one of the battery cells.

9. The apparatus of claim 7 wherein the input circuit is configured to generate the input current in response to a current generated by at least one of the battery cells.

10. The apparatus of claim 7 wherein the input circuit is configured to generate the input current in response to a current generated by a power supply.

11. The apparatus of claim 7 wherein each of at least one of the secondary windings is configured to generate a respective charge-balancing current flowing in only one direction.

12. The apparatus of claim 7 wherein each of at least one of the secondary windings is configured to generate a respective charge-balancing current only while the input current is flowing in a direction.

13. A system, comprising:
a ground node;
battery cells coupled in series to the ground node;
an input circuit configured to generate an input current, wherein the input circuit includes an inductor and a capacitor in series with a first primary winding and is configured to generate the input current by allowing the inductor and capacitor to resonate; and
transformers including
primary windings including the first primary winding coupled together in series and configured to receive the input current, wherein each of the transformers includes a respective one of the primary windings, and
secondary windings each configured to generate, in response to the input current, a respective charge-balancing current flowing through a respective at least one of the battery cells such that the respective charge-balancing current has a magnitude that is related to a voltage across the respective at least one of the battery cells, wherein the each transformer further includes one or more of the secondary windings.

14. The system of claim 13, further comprising:
a power supply coupled to the ground node and configured to generate a power-supply current; and
wherein the input circuit is configured to generate the input current in response to the power-supply current.

15. An apparatus, comprising:
transformers each including:
a respective primary winding coupled in series with the primary windings of the other transformers, and
at least one respective secondary winding each having first and second nodes configured to be coupled across at least one of a set of series-coupled battery cells;
a circuit configured to generate an input current through the primary windings;
electronic devices each having a first node coupled to one of the first and second nodes of a respective one of the secondary windings and having a second node configured to be coupled to a respective one of the battery cells; and
a series-resonant circuit in series with the primary windings.

16. The apparatus of claim 15, further comprising a ground node coupled to the series combination of the primary windings.

17. The apparatus of claim 15 wherein the series-resonant circuit includes an inductor in series with a capacitor.

18. The apparatus of claim 15, further comprising:
a ground node, and;
wherein the series-resonant circuit is coupled between the ground node and a series combination of the primary windings.

19. The apparatus of claim 15, further comprising:
an input node;
a ground node;
wherein the series-coupled battery cells are coupled between the input node and the ground node; and
wherein the circuit includes
a first switch coupled between the input node and the primary windings; and
a second switch coupled between the ground node and the primary windings.

20. The apparatus of claim 15 wherein each electronic device includes a respective switch.

21. The apparatus of claim 15, further comprising capacitors each coupled across a respective one of the electronic devices.

22. The apparatus of claim 15 wherein each of the secondary windings is configured to have a same winding direction.

23. The apparatus of claim 15 wherein the secondary windings of each transformer each have approximately a same number turns as the other secondary windings of the transformer.

24. A system, comprising:
a ground node;
battery cells coupled in series to the ground node;
transformers each including:
   a respective primary winding in series with the primary windings of the other transformers, and
   at least one respective secondary winding each coupled to a respective one of the battery cells;
a circuit configured to generate an input current through the primary windings and including a series-resonant circuit serially coupled between the primary windings and the ground node; and
electronic devices each coupled between a respective one of the secondary windings and a respective one of the battery cells.

25. A system, comprising:
a ground node;
battery cells coupled in series to the ground node;
transformers each including:
   a respective primary winding in series with the primary windings of the other transformers, and
   at least one respective secondary winding each coupled to a respective one of the battery cells;
a circuit configured to generate an input current through the primary windings;
electronic devices each coupled between a respective one of the secondary windings and a respective one of the battery cells; and
wherein the circuit includes:
   an input node;
   a series-resonant circuit having a first node coupled to the primary windings and having a second node;
   a first transistor coupled between the input node and the second node of the series-resonant circuit; and
   a second transistor coupled between the ground node and the second node of the series-resonant circuit; and
wherein the battery cells are coupled in series between the input node and the ground node.

26. The system of claim 25 wherein each of the secondary windings is configured to have a same winding direction.

27. A system, comprising:
a ground node;
battery cells coupled in series to the ground node;
transformers each including:
   a respective primary winding in series with the primary windings of the other transformers, and
   at least one respective secondary winding each coupled to a respective one of the battery cells;
a circuit configured to generate an input current through the primary windings;
electronic devices each coupled between a respective one of the secondary windings and a respective one of the battery cells;
wherein the circuit includes:
   an input node;
   a series-resonant circuit having a first node coupled to the primary windings and having a second node;
   a first transistor coupled between the input node and the second node of the series-resonant circuit; and
   a second transistor coupled between the ground node and the second node of the series-resonant circuit; and
a power supply coupled between the ground node and the input node.

* * * * *